United States Patent [19]

Yuo et al.

[11] Patent Number: 5,519,108
[45] Date of Patent: May 21, 1996

[54] CATALYTIC COMPOSITIONS CONTAINING TETRABUTYL TITANATE AND A MIXTURE OF COCATALYSTS FOR THE PREPARATION OF POLY(BUTYLENE TEREPHTHALATE)

[75] Inventors: Wu-Bin Yuo, Hsinchu; Chien-Shiun Liao, Shiann; Wen-Jeng Lin, Hsinchu; Cheng Yeh, Hsinchu; Yu-Shan Chao, Hsinchu; Li-Kuel Lin, Hsinchu Shiann, all of Taiwan

[73] Assignee: Industrial Technology Research Institute, Hsinchu, Taiwan

[21] Appl. No.: 481,114

[22] Filed: Jun. 7, 1995

[51] Int. Cl.$^6$ ............................................. C08G 63/02
[52] U.S. Cl. .................. 528/287; 528/176; 528/193; 528/194; 528/195; 528/272; 528/274; 528/275; 528/280; 528/281; 528/285; 507/153; 507/155; 507/161; 507/208; 507/170; 507/171
[58] Field of Search .................. 528/176, 193, 528/194, 195, 272, 274, 275, 287, 280, 281, 285; 502/153, 155, 161, 208, 170, 171

[56] References Cited

U.S. PATENT DOCUMENTS 4,906,724 3/1990 Yamanaka et al. .................. 528/193

Primary Examiner—James J. Seidleck
Assistant Examiner—Terressa M. Mosley
Attorney, Agent, or Firm—W. Wayne Liauh

[57] ABSTRACT

A catalyst composition for use in the preparation of poly(butylene terephthalate) from dimethyl terephthalate, comprising: (a) a titanium compound primary catalyst, from about 0.0005 PHR to about 5 PHR; (b) a first co-catalyst containing at least one of Zn, Co, Mn, Mg, Ca, or Pb series compounds, between about 0.0001 PHR and 5 PHR; and (c) a second co-catalyst containing an alkali metal phosphate, an alkali metal phosphite, an alkali hypophosphite, or an alkali metal polyphosphate between about 0.0001 PHR and 5 PHR; wherein PHR represents parts of the primary catalyst or the co-catalyst per one hundred parts, by weight, of dimethyl terephthalate. Preferred titanium compounds include tetrabutyl titanate or tetra(isopropyl)titanate. Preferred metal compounds for use as first co-catalyst are metal acetates. The alkali metal phosphate can be a phosphate salt containing one, two, or three metal groups; and the alkali metal phosphite can be a phosphite salt containing one or two metal groups. The alkali metal hypophosphite can be a hypophosphite salt containing any number of alkali metal groups. The alkali metal polyphosphate can be a polyphosphate salt containing one, two, three, four, or five alkali metal groups. With this catalyst composition, the rate of polycondensation was increased by 40 percent or more. The catalyst composition is also effective in the preparation of poly(butylene terephthalate) from terephthalic acid.

17 Claims, 1 Drawing Sheet

CATALYTIC COMPOSITIONS CONTAINING TETRABUTYL TITANATE AND A MIXTURE OF COCATALYSTS FOR THE PREPARATION OF POLY(BUTYLENE TEREPHTHALATE)

FIELD OF THE INVENTION

The present invention relates to a novel catalytic composition for the preparation of poly(butylene terephthalate). More specifically, the present invention relates to a novel catalyst composition containing tetrabutyl titanate and a mixture of co-catalysts for accelerating the rate of polycondensation during the preparation of poly(butylene terephthalate) from either the dimethyl terephthalate (DMT) process or the terephthalic acid (TPA) process.

BACKGROUND OF THE INVENTION

Poly(butylene terephthalate), or PBT, which is represented by the following formula:

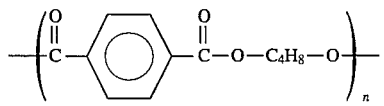

is an important polyester fiber; it is also an important crystalline thermoplastic resin. Polyester fibers, which show good resistance to most mineral acids and display excellent resistance to cleaning solvents and surfactants, are now the world's leading synthetic fibers. Crystalline thermoplastic poly(butylene terephthalate), along with other crystalline thermoplastic poly(alkylene terephthalates), such as poly(ethylene terephthalates), exhibits many favorable physical, mechanical, and electrical properties, and is considered one of the most important engineering plastics.

Poly(butylene terephthalate) is manufactured commercially by the so-called DMT (dimethyl terephthalate) or TPA (terephthalic acid) process, both of which typically use tetrabutyl titanate or tetraisopropyl titanate as the catalyst.

In the conventional DMT process for making poly(butylene terephthalate), dimethyl terephthalate (DMT) and butylene glycol (i.e., 1,4-butanediol, BDO) are used as the raw materials which are reacted at 220°~260° C., using tetrabutyl titanate or tetraisopropyl titanate as the catalyst to effectuate a transesterification reaction and form an intermediate product, which is bis(2-hydroxybutyl terephthalate) (BHBT). The intermediate product bis(2-hydroxybutyl terephthalate) is then subject to a high temperature (250°~290° C.) and high vacuum (less than 1 torr) to effectuate a condensation polymerization. After the reaction, the unreacted butylene glycol is removed to obtain the poly(butylene terephthalate) final product.

In the conventional TPA process, terephthalic acid (TPA) and butylene glycol are used as the raw material which are reacted at 220°~265° C. to effectuate an esterification reaction, using tetrabutyl titanate or tetraisopropyl titanate as the catalyst. An intermediate product of bis(2-hydroxybutyl terephthalate) is formed after dehydration of the terephthalic acid (TPA) and butylene glycol as a result of the esterification reaction therebetween. The intermediate product of bis(2-hydroxybutyl terephthalate) is similarly subject to a high temperature (250°~290° C.) and high vacuum (less than 1 torr) condensation polymerization. After the completion of the reaction, the unreacted butylene glycol is removed from the reaction product to obtain the poly(butylene terephthalate) final product.

In Netherland Pat. App. No. NL 86/2,460 (also appeared as EP 264,143; EP 87-201,541; and DE 3,765,514), it is disclosed an aromatic polyester blend, in which disodium diphosphate $Na_2H_2PO_4$ is added to a blend of poly(butylene terephthalate) and bisphenol A polycarbonate as a stabilizer. In Japan Laid-Open Patent Application JP 61-31,455 (also appeared in JP 92-061,903), it is disclosed a process for melt-molding polymer composition by which metal phosphates and/or phosphites are added, as viscosity stabilizers, to blends of aromatic polyesters, including poly(ethylene terephthalate) and poly(1,4-butylene terephthalate), and bisphenol A or bromobisphenol A polycarbonates. In U.S. Pat. No. 4,532,290, it is disclosed a stabilized polycarbonate-polyester composition, in which a thermoplastic composition containing a polycarbonate and a terephthalate polyester is melt stabilized with $NaH_2PO_4$ and/or $KH_2PO_4$. In Japan Patent 75-67,355, it is disclosed a polyester molding composition with good color stability containing poly(tetramethylene terephthalate), bisphenol A polycarbonate, butadiene-methyl methacrylatestyrene graff copolymer, and $NaH_2PO_4$. The composition has exhibited good moldability, chemical resistance, mechanical properties, heat-distortion resistance, and color. None of these references teaches the use of phosphate or phosphite as a co-catalyst for use with tetrabutyl titanate or tetraisopropyl titanate, for the production of poly(butylene terephthalate) from dimethyl terephthalate.

In U.S. Pat. No. 4,780,527, Tong, Chen, Yuo, and Chang teach a catalyzed process for the esterification of terephthalic acid with 1,4-butanediol. The catalyst composition, which consists of organic Sn or Ti compounds and organic and/or inorganic salts, was found to provide higher reaction conversion and reduce the production the THF by-product. In Japan Laid-Open Patent Application JP 60-161,455, it is disclosed a process for making polybutylene terephthalate with high impact resistance by reacting terephthalic acid and 1,4-butanediol with alkali metal hypophosphite and vinyl copolymer robber. In an article which appeared in *J. Appl. Polym. Sci.*, 45(20), pp. 371–3 (1992), it is disclosed that the formation of THF in the preparation of poly(butylene terephthalate) from butanediol and terephthalic acid can be reduced by the addition of potassium and sodium salts. Again, none of these references teaches the use of alkali metal phosphate or alkali metal phosphite as a co-catalyst for use with tetrabutyl titanate or tetraisopropyl titanate, for the production of poly(butylene terephthalate) from dimethyl terephthalate.

In a co-pending application Ser. No. 08/413,025, which was by a co-inventor of the present invention and has been assigned to the same assignee of the present invention, it was disclosed an improved tetrabutyl titanate based catalyst composition which contains: (1) between about 0.01 PHR and about 1 PHR of a primary catalyst tetrabutyl titanate, and (2) between about 0.001 PHR and 1 PHR of an alkali metal phosphate or an alkali metal phosphite co-catalyst. In the above designation, PHR stands for parts per hundred parts, by weight, of dimethyl terephthalate. In that application, the alkali metal phosphate can be a phosphate salt containing one, two, or three metal groups, and the alkali metal phosphite can be a phosphite salt containing one or two metal groups. Examples of the alkali metal phosphates include tri sodium phosphate, disodium hydrogen phosphate, and sodium dihydrogen phosphate. Examples of the alkali metal phosphites include disodium hydrogen phosphite, and sodium dihydrogen phosphite. It has been demonstrated in this co-pending application that the polymerization rate can be increased by 10 percent using the cocatalyst disclosed therein.

Because of the high commercial value and large volume of poly(butylene terephthalate), any incremental improvement in the production rate thereof is very significant. Therefore, it is important to improve the performance of the tetrabutyl titanate (or tetraisopropyl titanate) based catalyst composition. Furthermore, an increased production rate would also reduce the time during which the expensive tetrabutyl titanate catalyst is subject to the possibility of being poisoned, per unit volume of poly(butylene terephthalate) produced. This can also result in important cost savings in the production of poly(butylene terephthalate).

SUMMARY OF THE INVENTION

The primary object of the present invention is to develop an improved tetrabutyl titanate or tetraisopropyl titanate based catalyst composition for the preparation of poly(butylene terephthalate). More specifically, the primary object of the present invention is to develop an improved tetrabutyl titanate or tetraisopropyl titanate based catalyst composition for accelerating the rate of polycondensation during the production of poly(butylene terephthalate) from the dimethyl terephthalate (DMT) process. The novel catalyst composition disclosed in the present invention contains tetrabutyl titanate or tetraisopropyl titanate as the primary catalyst, and a co-catalyst mixture, which comprises: (1) at least one of Zn, Co, Mn, Mg, Ca, or Pb series compounds and (2) an alkali metal phosphate, an alkali metal phosphite, an alkali hypophosphite, or an alkali metal polyphosphate. The novel catalyst composition disclosed in the present invention can also be used in the production of poly(butylene terephthalate) from the terephthalic acid (TPA) process.

The improved tetrabutyl titanate or tetraisopropyl titanate based catalyst composition disclosed in the present invention contains (1) between about 0:0001 PHR and about 5 PHR of a tetrabutyl titanate or tetraisopropyl titanate primary catalyst, and a mixture of co-catalysts, which contain: (2-a) between about 0.0001 PHR and 5 PHR of at least one of Zn, Co, Mn, Mg, Ca, or Pb series compounds, and (2-b) between about 0.0001 PHR and 5 PHR of an alkali metal phosphate, an alkali metal phosphite, an alkali hypophosphite, or an alkali metal polyphosphate. In the above designation, PHR stands for parts per hundred parts, by weight, of dimethyl terephthalate. The alkali metal phosphate that can be used as a co-catalyst disclosed in the present invention can be a phosphate salt containing one, two, or three metal groups. Examples of the alkali metal phosphates include trisodium phosphate, disodium hydrogen phosphate, and sodium dihydrogen phosphate. And the alkali metal phosphite that can be used as a co-catalyst disclosed in the present invention can be a phosphite salt containing one or two metal groups. Examples of the alkali metal phosphites include disodium hydrogen phosphite, and sodium dihydrogen phosphite. The alkali metal hypophosphite can be a hypophosphite salt containing any number of alkali metal groups. The alkali metal polyphosphate can be a polyphosphate salt containing one, two, three, four, or five alkali metal groups. Preferred metal compounds are metal carboxylates, or more preferred, metal acetates.

In using the improved tetrabutyl titanate or tetraisopropyl titanate based catalyst composition disclosed in the present invention, the primary catalyst and the co-catalyst mixture can be added into the reaction mixture containing dimethyl terephthalate and butylene glycol. Or preferably, the co-catalyst mixture is first mixed with dimethyl terephthalate and the tetrabutyl titanate or tetraisopropyl titanate primary catalyst is mixed into butylene glycol, which is a liquid. The reactant butylene glycol is typically in excess relative to the dimethyl terephthalate reactant. Then the two mixtures are mixed together to form the reaction mixture. Typically, the reaction is conducted in two stages, a transesterification stage followed by a polycondensation stage. The polycondensation reaction is typically conducted at a higher temperature and higher vacuum than the transesterification stage.

With the addition of the co-catalyst mixture disclosed in the present invention, the polycondensation rate can be increased by 40 percent or more. This a substantial improvement over the catalyst composition disclosed in the copending application, which increased the polycondensation rate by 10 percent.

BRIEF DESCRIPTION OF THE DRAWING

The present invention will be described in detail with reference to the drawing showing the preferred embodiment of the present invention, wherein.

DETAILED DESCRIPTION OF THE PREFERRED EMBODIMENT

Figure 1:
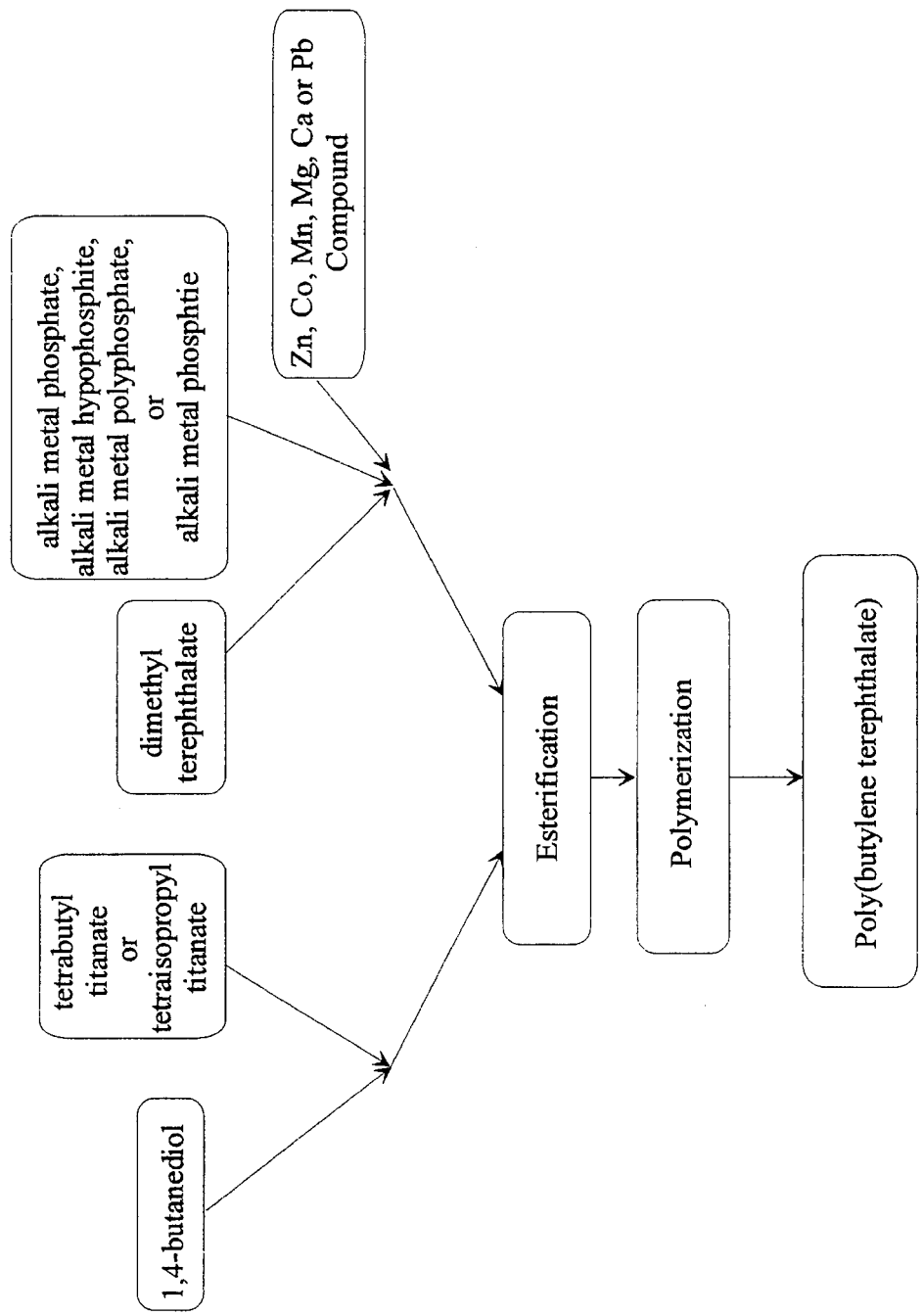
FIG. 1 is a schematic diagram showing the steps involved in a preferred embodiment in utilizing the improved tetrabutyl titanate based catalyst composition disclosed in the present invention for the production of poly(butylene terephthalate) from dimethyl terephthalate.

The present invention discloses an improved tetrabutyl titanate based catalyst composition for the preparation of poly(butylene terephthalate) from dimethyl terephthalate (DMT) and butylene glycol (or 1,4-butanediol, BDO). The improved tetrabutyl titanate based catalyst composition disclosed in the present invention contains: (1) a tetrabutyl titanate primary catalyst, in the amount from about 0.0001 PHR (parts per hundred parts, by weight, of resin, wherein the amount of the theoretical yield of the resin poly(butylene terephthalate) is indicated by the amount of dimethyl terephthalate in the feed) to about 5 PHR; and a co-catalyst mixture containing (2-a) between about 0.0001 PHR and 5 PHR of at least one of Zn, Co, Mn, Mg, Ca, or Pb series compounds, and (2-b) between about 0.0001 PHR and 5 PHR of an alkali metal phosphate, an alkali metal phosphite, an alkali hypophosphite, or an alkali metal polyphosphate. The alkali metal phosphate that can be used as a co-catalyst disclosed in the present invention can be a phosphate salt containing one, two, or three metal groups. Examples of the alkali metal phosphates include trisodium phosphate, disodium hydrogen phosphate, and sodium dihydrogen phosphate. And the alkali metal phosphite that can be used as a co-catalyst disclosed in the present invention can be a phosphite salt containing one or two metal groups. Examples of the alkali metal phosphites include disodium hydrogen phosphite, and sodium dihydrogen phosphite. The alkali metal hypophosphite can be a hypophosphite salt containing any number of alkali metal groups. The alkali metal polyphosphate can be a polyphosphate salt containing one, two, three, four, or five alkali metal groups.

In using the improved tetrabutyl titanate based catalyst composition disclosed in the present invention, the primary catalyst and the co-catalyst mixture can be added into the reaction mixture, in which the reactant butylene glycol is typically in excess relative to the dimethyl terephthalate reactant, at the same time. Preferably, the co-catalyst mixture is first mixed with dimethyl terephthalate, and the tetrabutyl titanate primary catalyst is mixed into butylene glycol, which is a liquid, as shown in FIG. 1. Then, also as shown in FIG. 1, the two mixtures are mixed together to form the reaction mixture. As described above, the reaction mechanism can be considered as consisting of two stages—a transesterification stage followed by a condensation polymerization stage. The polymerization (i.e., polycondensation) reaction is typically conducted at a higher temperature than the transesterification stage and at a higher vacuum.

By adding the co-catalyst mixture disclosed in the present invention in a tetrabutyl titanate catalyst, the polycondensation rate was found to have increased by at least 40 percent. Thus great economic benefits can be realized using the co-catalyst composition disclosed in the present invention, in conjunction with the commonly utilized tetrabutyl titanate primary catalyst.

The present invention will now be described more specifically with reference to the following examples. It is to be noted that the following descriptions of example including preferred embodiment of this invention are presented herein for purpose of illustration and description; it is not intended to be exhaustive or to limit the invention to the precise form disclosed.

Comparative Example 1

A reaction vessel, designated as CY, affixed to a fractional distillation column was rinsed thoroughly and blown dry. The temperature of the reaction vessel was gradually raised to 150° C. Reactants dimethyl terephthalate (DMT) and butylene glycol (BDO), in a molar ratio of 1.0:1.5, were precisely measured. The butylene glycol was divided into a small beaker and a large beaker. Tetrabutyl titanate was injected into the small beaker containing butylene glycol using a syringe. The weight of tetrabutyl titanate, in the amount of 0.03 parts per 100 parts of dimethyl terephthalate (PHR, or pans per one hundred pans of resin), was precisely measured.

After the temperature of the reaction vessel reached 150° C., the dimethyl terephthalate mixture was poured into the reaction vessel, followed by adding the butylene glycol/tetrabutyl titanate contained in the small beaker. The small beaker was rinsed with the butylene glycol to remove the tetrabutyl titanate that remained therein. The reaction vessel was purged with nitrogen at a flow rate of 20 ml/min to remove air and oxygen. Then, the external temperature of the thermal bath, in which reaction vessel was placed, was set at 265° C., and the ball valve to the fractional distillation column was opened, while the temperature of the fractional distillation column was set at 90° C. This marked the beginning time of the transesterification reaction. Samples were taken from the reaction vessel at predetermined time intervals and were analyzed. After the transesterification reaction was 100% completed, the ball valve connected to the fractional distillation column was closed to stop the reaction. Then a side valve connected to a vacuum pump was opened to create a vacuum inside the reaction vessel. In the same time, the temperature setting of the thermal bath was raised to 295° C. This process continued for 40 minutes when the vacuum inside the reaction vessel reached 1 cm Hg. Thereafter, the vacuuming process was switched to a high-vacuum environment and continued until the vacuum inside the reaction vessel reached 0.5~0.6 torr. The switch to the high-vacuum environment marked the beginning time for the polymerization reaction. Samples were taken from the reaction vessel at predetermined time intervals and were analyzed during the polymerization step.

The poly(butylene terephthalate) prepared from Comparative Example 1 was measured for its intrinsic viscosity using a Cannon No. 150 viscometer at a temperature of 30°±0.1° C. The poly(butylene terephthalate) was dissolved in a solvent containing phenol/tetrachloroethane in a ratio of 6/4 by weight. The measured intrinsic viscosity, which is summarized in Table 1, was 0.97 dl/g, and the reaction time was 75 minutes.

Comparative Example 2

A reaction vessel, designated as CY, affixed to a fractional distillation column was rinsed thoroughly and blown dry. The temperature of the reaction vessel was gradually raised to 150° C. Reactants dimethyl terephthalate (DMT) and butylene glycol (BDO), in a molar ratio of 1.0:1.5, were precisely measured. The butylene glycol was divided into a small beaker and a large beaker. Tetrabutyl titanate was injected into the small beaker containing butylene glycol using a syringe. The weight of tetrabutyl titanate, in the amount of 0.03 parts per 100 parts of dimethyl terephthalate (PHR, or pans per one hundred pans of resin), was precisely measured. Sodium phosphate ($NaH_2PO_4$), in the amount of 0.03 PHR was added to dimethyl terephthalate to form a sodium phosphate/dimethyl terephthalate mixture.

After the temperature of the reaction vessel reached 150° C., the sodium phosphate/dimethyl terephthalate mixture was poured into the reaction vessel, followed by adding the butylene glycol/tetrabutyl titanate contained in the small beaker. The small beaker was rinsed with the butylene glycol to remove the tetrabutyl titanate that remained therein. The reaction vessel was purged with nitrogen at a flow rate of 20 ml/min to remove air and oxygen. Then, the external temperature of the thermal bath, in which reaction vessel was placed, was set at 265° C., and the ball valve to the fractional distillation column was opened, while the temperature of the fractional distillation column was set at 90° C. This marked the beginning time of the transesterification reaction. Samples were taken from the reaction vessel at predetermined time intervals and were analyzed. After the transesterification reaction was 100% completed, the ball valve connected to the fractional distillation column was closed to stop the reaction. Then a side valve connected to a vacuum pump was opened to create a vacuum inside the reaction vessel. In the same time, the temperature setting of the thermal bath was raised to 295° C. This process continued for 40 minutes when the vacuum inside the reaction vessel reached 1 cm Hg. Thereafter, the vacuuming process was switched to a high-vacuum environment and continued until the vacuum inside the reaction vessel reached 0.5~0.6 torr. The switch to the high-vacuum environment marked the beginning time for the polymerization reaction.

The poly(butylene terephthalate) prepared from Comparative Example 2 was measured for its intrinsic viscosity using a Cannon No. 150 viscometer at a temperature of 30°±0.1° C. The poly(butylene terephthalate) was dissolved in a solvent containing phenol/tetrachloroethane in a ratio of 6/4 by weight. The measured intrinsic viscosity, which is summarized in Table 1, was 0.95 dl/g, and the reaction time was 55 minutes.

EXAMPLE 1

A reaction vessel, designated as CY, affixed to a fractional distillation column was rinsed thoroughly and blown dry. The temperature of the reaction vessel was gradually raised to 150° C. Reactants dimethyl terephthalate (DMT) and butylene glycol (BDO), in a molar ratio of 1.0:1.5, were precisely measured. The butylene glycol was divided into a small beaker and a large beaker. Tetrabutyl titanate was injected into the small beaker containing butylene glycol using a syringe. The weight of tetrabutyl titanate, in the amount of 0.03 parts per 100 parts of dimethyl terephthalate, was precisely measured. A co-catalyst mixture, which contains co-catalyst components in the amount of TBT/Mn(OAc)$_2$/Co(OAc)$_2$/Na$_2$HPO$_4$=0.03/0.017/0.008/0.03, was added to dimethyl terephthalate to form a dimethyl terephthalate/co-catalyst mixture.

After the temperature of the reaction vessel reached 150° C., the dimethyl terephthalate/co-catalyst mixture was poured into the reaction vessel, followed by adding the butylene glycol/tetrabutyl titanate contained in the small beaker. The small beaker was rinsed with the butylene glycol to remove the tetrabutyl titanate that remained therein. The reaction vessel was purged with nitrogen at a flow rate of 20 ml/min to remove air and oxygen. Then, the external temperature of the thermal bath, in which reaction vessel was placed, was set at 265° C., and the ball valve to the fractional distillation column was opened, while the temperature of the fractional distillation column was set at 90° C. This marked the beginning time of the transesterification reaction. Samples were taken from the reaction vessel at predetermined time intervals and were analyzed. After the transesterification reaction was 100% completed, the ball valve connected to the fractional distillation column was closed to stop the reaction. Then a side valve connected to a vacuum pump was opened to create a vacuum inside the reaction vessel. In the same time, the temperature setting of the thermal bath was raised to 295° C. This process continued for 40 minutes when the vacuum inside the reaction vessel reached 1 cm Hg. Thereafter, the vacuuming process was switched to a high-vacuum environment and continued until the vacuum inside the reaction vessel reached 0.5~0.6 torr. The switch to the high-vacuum environment marked the beginning time for the polymerization reaction.

The poly(butylene terephthalate) prepared from Example 1 was measured for its intrinsic viscosity using a Cannon No. 150 viscometer at a temperature of 30°±0.1° C. The poly(butylene terephthalate) was dissolved in a solvent containing phenol/tetrachloroethane in a ratio of 6/4 by weight. The measured intrinsic viscosity, which is summarized in Table 1, was 0.91 dl/g, and the reaction time was 43 minutes.

EXAMPLE 2

The procedure in Example 2 was identical to that in Example 1, except that co-catalyst mixture contains co-catalyst components in the amount of TBT/Mn(OAc)$_2$/Co(OAc)$_2$/Na$_5$P$_3$O$_{11}$=0.03/0.017/0.008/0.03. The measured intrinsic viscosity, which is summarized in Table 1, was 1.0 dl/g, and the reaction time was 52 minutes.

EXAMPLE 3

The procedure in Example 3 was identical to that in Example 1, except that co-catalyst mixture contains co-catalyst components in the amount of TBT/Mn(OAc)$_2$/Co(OAc)$_2$/NaH$_2$PO$_4$=0.03/0.017/0.008/0.03. The measured intrinsic viscosity, which is summarized in Table 1, was 1.02 dl/g, and the reaction time was 25 minutes.

EXAMPLE 4

The procedure in Example 4 was identical to that in Example 1, except that co-catalyst mixture contains co-catalyst components in the amount of TBT/Mn(OAc)$_2$/Co(OAc)$_2$/NaH$_2$PO$_2$=0.03/0.017/0.008/0.03. The measured intrinsic viscosity, which is summarized in Table 1, was 0.92 dl/g, and the reaction time was 29 minutes.

EXAMPLE 5

The procedure in Example 5 was identical to that in Example 1, except that co-catalyst mixture contains co-catalyst components in the amount of TBT/Mn(OAc)$_2$/Co(OAc)$_2$/NaH$_2$PO$_3$=0.03/0.017/0.008/0.03. The measured intrinsic viscosity, which is summarized in Table 1, was 1.03 dl/g, and the reaction time was 34 minutes.

By comparing Comparative Examples 1 and 2 with Examples 1~5, it is clearly seen that the novel catalyst composition disclosed in the present invention, which contains a co-catalyst mixture added to tetrabutyl titanate, increases the rate of polycondensation by at least 40 percent, relative to the case using the tetrabutyl titanate catalyst alone. In some cases, the polycondensation rate was improved by about 200 percent.

TABLE 1

| Example No. | Catalyst Composition | Polymerization time (min.) | Intrinsic viscosity (dl/g) |
| --- | --- | --- | --- |
| Comp. Ex. 1 | Tetrabutyl titanate (TBT) | 10 | 0.97 |
| Comp. Ex. 2 | TBT/NaH$_2$PO$_4$ = 0.03/0.03 | 55 | 0.95 |
| Example 1 | TBT/Mn(OAc)$_2$/Co(OAc)$_2$/Na$_2$HPO$_4$ = 0.03/0.017/0.008/0.03 | 43 | 0.91 |
| Example 2 | TBT/Mn(OAc)$_2$/Co(OAc)$_2$/Na$_5$P$_3$O$_{11}$ = 0.03/0.017/0.008/0.03 | 52 | 1.0 |
| Example 3 | TBT/Mn(OAc)$_2$/Co(OAc)$_2$/NaH$_2$PO$_4$ = 0.03/0.017/0.008/0.03 | 25 | 1.02 |
| Example 4 | TBT/Mn(OAc)$_2$/Co(OAc)$_2$/NaH$_2$PO$_2$ = 0.03/0.017/0.008/0.03 | 29 | 0.92 |
| Example 5 | TBT/Mn(OAc)$_2$/Co(OAc)$_2$/NaH$_2$PO$_3$ = 0.03/0.017/0.008/0.003 | 34 | 1.03 |

*Reactor = CY series, BDO/DMT (mol/mol) = 1.5/1.0.

Comparative Example 3

The procedure in Comparative Example 3 was identical to that in Comparative Example 1, except that a different reaction vessel, designated as RJ, was used. The measured intrinsic viscosity, which is summarized in Table 2, was 0.82 dl/g, and the reaction time was 19 minutes.

EXAMPLE 6

The procedure in Example 6 was identical to that in Example 1, except that a different reaction vessel, designated as RJ, was used, and that the co-catalyst mixture contains co-catalyst components in the amount of TBT/Mn(OAc)$_2$/Co(OAc)$_2$/NaH$_2$PO$_4$=0.03/0.017/0.008/0.03. The measured intrinsic viscosity, which is summarized in Table 2, was 0.87 dl/g, and the reaction time was 9 minutes.

EXAMPLE 7

The procedure in Example 7 was identical to that in Example 6, except that the co-catalyst mixture contains co-catalyst components in the amount of TBT/Zn(OAc)$_2$/Ca(OAc)$_2$/NaH$_2$PO$_4$= 0.03/0.025/0.035/0.03. The measured intrinsic viscosity, which is summarized in Table 2, was 0.82 dl/g, and the reaction time was 9 minutes.

EXAMPLE 8

The procedure in Example 8 was identical to that in Example 6, except that the co-catalyst mixture contains co-catalyst components in the amount of TBT/Zn(OAc)$_2$/Pb(OAc)$_2$/NaH$_2$PO$_4$=0.03/0.025/0.016/0.03. The measured intrinsic viscosity, which is summarized in Table 2, was 0.82 dl/g, and the reaction time was 9 minutes.

Example 9

The procedure in Example 9 was identical to that in Example 6, except that the co-catalyst mixture contains co-catalyst components in the amount of TBT/Zn(OAc)$_2$/Mg(OAc)$_2$/NaH$_2$PO$_4$=0.03/0.025/0.025/0.03. The measured intrinsic viscosity, which is summarized in Table 2, was 0.89 dl/g, and the reaction time was 11 minutes.

EXAMPLE 10

The procedure in Example 10 was identical to that in Example 6, except that the co-catalyst mixture contains co-catalyst components in the amount of TBT/Co(OAc)$_2$/Ca(OAc)$_2$/NaH$_2$PO$_4$=0.03/0.017/0.017/0.03. The measured intrinsic viscosity, which is summarized in Table 2, was 0.89 dl/g, and the reaction time was 12 minutes.

By comparing Comparative Example 3 with Examples 6–10, it is clearly seen that the novel catalyst composition disclosed in the present invention, which contains a co-catalyst mixture added to tetrabutyl titanate, also increases the rate of polycondensation by at least 40 percent, relative to the case using the tetrabutyl titanate catalyst alone, in a different type of reactor. In most cases, the improvement was better than 100 percent.

Comparative Example 4

The procedure in Comparative Example 4 was identical to that in Comparative Example 3, except that a different reaction vessel, designated as RL, was used. The measured intrinsic viscosity, which is summarized in Table 3, was 0.71 dl/g, and the reaction time was 18 minutes.

EXAMPLE 11

The procedure in Example 11 was identical to that in Example 6, except that a different reaction vessel, designated as RL, was used, and that the co-catalyst mixture contains co-catalyst components in the amount of TBT/Co(OAc)$_2$/NaH$_2$PO$_4$=0.03/0.017/0.03. The measured intrinsic viscosity, which is summarized in Table 3, was 0.81 dl/g, and the reaction time was 7 minutes.

EXAMPLE 12

The procedure in Example 12 was identical to that in Example 11, except that the co-catalyst mixture contains co-catalyst components in the amount of TBT/Mn(OAc)$_2$/Zn(OAc)$_2$Pb(OAc)$_2$/NaH$_2$PO$_4$=0.03/0.014/0.025/0.008/0.03. The measured intrinsic viscosity, which is summarized in Table 3, was 0.73 dl/g, and the reaction time was 9 minutes.

EXAMPLE 13

The procedure in Example 13 was identical to that in Example 11, except that the co-catalyst mixture contains co-catalyst components in the amount of TBT/Zn(OAc)$_2$/NaH$_2$PO$_4$=0.03/0.025/0.03. The measured intrinsic viscosity, which is summarized in Table 3, was 0.76 dl/g, and the reaction time was 6 minutes.

EXAMPLE 14

The procedure in Example 14 was identical to that in Example 11, except that the co-catalyst mixture contains co-catalyst components in the amount of TBT/Co(OAc)$_2$/Zn(OAc)$_2$/NaH$_2$PO$_4$=0.03/0.025/0.017/0.03. The measured intrinsic viscosity, which is summarized in Table 3, was 0.78 dl/g, and the reaction time was 6 minutes.

EXAMPLE 15

The procedure in Example 15 was identical to that in Example 11, except that the co-catalyst mixture contains co-catalyst components in the amount of TBT/Co(OAc)$_2$/Pb(OAc)$_2$/NaH$_2$PO$_4$=0.03/0.025/0.017/0.03. The measured intrinsic viscosity, which is summarized in Table 3, was 0.77 dl/g, and the reaction time was 7 minutes.

TABLE 2

| Example No. | Catalyst Composition | Polymerization time (min.) | Intrinsic viscosity (dl/g) |
|---|---|---|---|
| Comp. Ex. 3 | Tetrabutyl titanate (TBT), 0.03 PHR | 19 | 0.82 |
| Example 6 | TBT/Mn(OAc)$_2$/Co(OAc)$_2$/NaH$_2$PO$_4$ = 0.03/0.017/0.008/0.03 | 9 | 0.87 |
| Example 7 | TBT/Zn(OAc)$_2$/Ca(OAc)$_2$/NaH$_2$PO$_4$ = 0.03/0.025/0.035/0.03 | 9 | 0.82 |
| Example 8 | TBT/Zn(OAc)$_2$/Pb(OAc)$_2$/NaH$_2$PO$_4$ = 0.03/0.025/0.016/0.03 | 7 | 0.89 |
| Example 9 | TBT/Zn(OAc)$_2$/Mg(OAc)$_2$/NaH$_2$PO$_4$ = 0.03/0.025/0.025/0.03 | 11 | 0.89 |
| Example 10 | TBT/Co(OAc)$_2$/Ca(OAc)$_2$/NaH$_2$PO$_4$ = 0.03/0.017/0.017/0.03 | 12 | 0.89 |

*Reactor = RJ series, BDO/DMT (mol/mol) = 1.5/1.0.

EXAMPLE 16

The procedure in Example 16 was identical to that in Example 11, except that the co-catalyst mixture contains co-catalyst components in the amount of TBT/Mn(OAc)$_2$/Co(OAc)$_2$/K$_2$HPO$_4$=0.03/0.017/0.008/0.03. The measured intrinsic viscosity, which is summarized in Table 3, was 0.75 dl/g, and the reaction time was 11 minutes.

EXAMPLE 17

The procedure in Example 17 was identical to that in Example 11, except that the co-catalyst mixture contains co-catalyst components in the amount of TBT/Mn(OAc)$_2$/Co(OAc)$_2$/NaH$_2$PO$_4$=0.03/0.017/0.008/0.03. The measured intrinsic viscosity, which is summarized in Table 3, was 0.72 dl/g, and the reaction time was 15 minutes.

By comparing Comparative Example 4 with Examples 11~17, the same conclusion can be obtained that the novel catalyst composition disclosed in the present invention, which contains a co-catalyst mixture added to tetrabutyl titanate, increases the rate of polycondensation by at least 40 percent, relative to the case using the tetrabutyl titanate catalyst alone, in another different type of reactor. The improvement can be as high as 200 percent in certain cases.

set at 265° C., and the ball valve to the fractional distillation column was opened, while the temperature of the fractional distillation column was set at 120° C. This marked the beginning time of the esterification reaction. Samples were taken from the reaction vessel at predetermined time intervals and were analyzed. After the esterification reaction was 100% completed, the ball valve connected to the fractional distillation column was closed to stop the reaction. Then a side valve connected to a vacuum pump was opened to create a vacuum inside the reaction vessel. In the same time, the temperature setting of the thermal bath was raised to 295° C. This process continued for 40 minutes when the vacuum inside the reaction vessel reached 1 cm Hg. Thereafter, the vacuuming process was switched to a high-vacuum environment and continued until the vacuum inside the reaction vessel reached 0.5~0.6 torr. The switch to the high-vacuum environment marked the beginning time for the polymerization reaction.

The poly(butylene terephthalate) prepared from Comparative Example 5 was measured for its intrinsic viscosity using a Cannon No. 150 viscometer at a temperature of 30°±0.1° C. The poly(butylene terephthalate) was dissolved in a solvent containing phenol/tetrachloroethane in a ratio of 6/4 by weight. The measured intrinsic viscosity, which is

TABLE 3

| Example No. | Catalyst Composition | Polymerization time (min.) | Intrinsic viscosity (dl/g) |
|---|---|---|---|
| Comp. Ex. 4 | Tetrabutyl titanate (TBT), 0.03 PHR | 18 | 0.71 |
| Example 11 | TBT/Co(OAc)$_2$/NaH$_2$PO$_4$ = 0.03/0.017/0.03 | 7 | 0.81 |
| Example 12 | TBT/Mn(OAc)$_2$/Zn(OAc)$_2$/Pb(OAc)$_2$/NaH$_2$PO$_4$ = 0.03/0.014/0.025/0.008/0.03 | 9 | 0.73 |
| Example 13 | TBT/Zn(OAc)$_2$/NaH$_2$PO$_4$ = 0.03/0.025/0.03 | 6 | 0.76 |
| Example 14 | TBT/Co(OAc)$_2$/Zn(OAc)$_2$/NaH$_2$PO$_4$ = 0.03/0.025/0.017/0.03 | 6 | 0.78 |
| Example 15 | TBT/Co(OAc)$_2$/Pb(OAc)$_2$/NaH$_2$PO$_4$ = 0.03/0.025/0.017/0.03 | 7 | 0.77 |
| Example 16 | TBT/Mn(OAc)$_2$/Co(OAc)$_2$/K$_2$HPO$_4$ = 0.03/0.017/0.008/0.03 | 11 | 0.75 |
| Example 17 | TBT/Mn(OAc)$_2$/Co(OAc)$_2$/NaH$_2$PO$_4$ = 0.03/0.017/0.008/0.03 | 15 | 0.72 |

*Reactor = RL series, BDO/DMT (mol/mol) = 1.5/1.0.

Comparative Example 5

A reaction vessel, designated as RL, affixed to a fractional distillation column was rinsed thoroughly and blown dry. The temperature of the reaction vessel was gradually raised to 150° C. Reactants terephthalic acid (TPA) and butylene glycol (BDO), in a molar ratio of 1.0:1.7, were precisely measured. The butylene glycol was divided into a small beaker and a large beaker. Tetrabutyl titanate was injected into the small beaker containing butylene glycol using a syringe. The weight of tetrabutyl titanate, in the amount of 0.2 parts per 100 parts of terephthalic acid (PHR, or parts per one hundred parts of resin), was precisely measured.

After the temperature of the reaction vessel reached 150° C., the terephthalic acid/co-catalyst mixture was poured into the reaction vessel, followed by adding the butylene glycol/tetrabutyl titanate contained in the small beaker. The small beaker was rinsed with the butylene glycol to remove the tetrabutyl titanate that remained therein. The reaction vessel was purged with nitrogen at a flow rate of 20 ml/min to remove air and oxygen. Then, the external temperature of the thermal bath, in which reaction vessel was placed, was summarized in Table 4, was 0.78 dl/g, and the reaction time was 40 minutes.

EXAMPLE 18

A reaction vessel, designated as RL, affixed to a fractional distillation column was rinsed thoroughly and blown dry. The temperature of the reaction vessel was gradually raised to 150° C. Reactants terephthalic acid (TPA) and butylene glycol (BDO), in a molar ratio of 1.0:1.7, were precisely measured. The butylene glycol was divided into a small beaker and a large beaker. Tetrabutyl titanate was injected into the small beaker containing butylene glycol using a syringe. The weight of tetrabutyl titanate, in the amount of 0.03 parts per 100 parts of terephthalic acid, was precisely measured. A co-catalyst mixture, which contains co-catalyst components in the amount of TBT/Mn(OAc)$_2$/Zn(OAc)$_2$/NaH$_2$PO$_4$=0.2/0.03/0.029/0.1, was added to terephthalic acid to form a terephthalic acid/co-catalyst mixture.

After the temperature of the reaction vessel reached 150° C., the terephthalic acid/co-catalyst mixture was poured into the reaction vessel, followed by adding the butylene glycol/ tetrabutyl titanate contained in the small beaker. The small beaker was rinsed with the butylene glycol to remove the tetrabutyl titanate that remained therein. The reaction vessel was purged with nitrogen at a flow rate of 20 ml/min to remove air and oxygen. Then, the external temperature of the thermal bath, in which reaction vessel was placed, was set at 265° C., and the ball valve to the fractional distillation column was opened, while the temperature of the fractional distillation column was set at 120° C. This marked the beginning time of the esterification reaction. Samples were taken from the reaction vessel at predetermined time intervals and were analyzed. After the esterification reaction was 100% completed, the ball valve connected to the fractional distillation column was closed to stop the reaction. Then a side valve connected to a vacuum pump was opened to create a vacuum inside the reaction vessel. In the same time, the temperature setting of the thermal bath was raised to 295° C. This process continued for 40 minutes when the vacuum inside the reaction vessel reached 1 cm Hg. Thereafter, the vacuuming process was switched to a high-vacuum environment and continued until the vacuum inside the reaction vessel reached 0.5~0.6 torr. The switch to the high-vacuum environment marked the beginning time for the polymerization reaction.

The poly(butylene terephthalate) prepared from Example 18 was measured for its intrinsic viscosity using a Cannon No. 150 viscometer at a temperature of 30°±0.1° C. The poly(butylene terephthalate) was dissolved in a solvent containing phenol/tetrachloroethane in a ratio of 6/4 by weight. The measured intrinsic viscosity, which is summarized in Table 4, was 0.78 dl/g, and the reaction time was 19 minutes.

EXAMPLE 19

The procedure in Example 19 was identical to that in Example 18, except that co-catalyst mixture contains co-catalyst components in the amount of TBT/Co(OAc)$_2$/Zn(OAc)$_2$/NaH$_2$PO$_4$=0.2/0.02/0.029/0.1. The measured intrinsic viscosity, which is summarized in Table 4, was 0.79 dl/g, and the reaction time was 18 minutes.

By comparing Comparative 5 with Examples 18–19, the same conclusion was obtained for the TPA process that the novel catalyst composition disclosed in the present invention, which contains the novel co-catalyst mixture added to tetrabutyl titanate, increases the rate of polycondensation by at least 40 percent, relative to the case using the tetrabutyl titanate catalyst alone. In all the cases reported in Table 4, the improvement was better than 200.

the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A catalyst composition for use in the preparation of poly(butylene terephthalate) from either dimethyl terephthalate or terephthalic acid, comprising:

(a) a titanium compound primary catalyst, from about 0.0001 PHR to about 5 PHR, wherein PHR represents parts, by weight, of said primary catalyst or said co-catalyst per one hundred parts, by weight, of dimethyl terephthalate wherein said titanium compound primary catalyst is tetrabutyl titanate or tetra(isopropyl)titanate wherein said titanium compound primary catalyst is tetrabutyl titanate or tetra(isopropyl)titanate;

(b) a first co-catalyst comprising at least a metal compound selected from the group consisting of Zn, Co, Mn, Mg, Ca, and Pb compounds, from about 0.0001 PHR to 5 PHR; and (c) a second co-catalyst comprising an alkali metal phosphate, an alkali metal phosphite, an alkali hypophosphite, or an alkali metal polyphosphate, from about 0.0001 PHR to 5 PHR.

2. A catalyst composition for use in the preparation of poly(butylene terephthalate) according to claim 1 wherein said poly(butylene terephthalate) is prepared from a polycondensation of dimethyl terephthalate or terephthalic acid monomer with butylene glycol monomer.

3. A catalyst composition for use in the preparation of poly(butylene terephthalate) according to claim 1 wherein said titanium compound primary catalyst is present in a amount between about 0.0005 PHR to about 1 PHR.

4. A catalyst composition for use in the preparation of poly(butylene terephthalate) from dimethyl terephthalate according to claim 1 wherein said titanium compound primary catalyst is present in a amount between about 0.01 PHR to about 0.6 PHR.

5. A catalyst composition for use in the preparation of poly(butylene terephthalate) according to claim 1 wherein said first co-catalyst comprises at least a metal carboxylate selected from the group consisting of Zn, Co, Mn, Mg, Ca, and Pb carboxylates.

6. A catalyst composition for use in the preparation of poly(butylene terephthalate) according to claim 1 wherein

TABLE 4

| Example No. | Catalyst Composition | Polymerization time (min.) | Intrinsic viscosity (dl/g) |
| --- | --- | --- | --- |
| Comp. Ex. 4 | Tetrabutyl titanate (TBT), 0.2 PHR | 40 | 0.78 |
| Example 18 | TBT/Mn(OAc)$_2$/Zn(OAc)$_2$/NaH$_2$PO$_4$ = 0.2/0.03/0.029/0.1 | 19 | 0.78 |
| Example 19 | TBT/Co(OAc)$_2$/Zn(OAc)$_2$/NaH$_2$PO$_4$ = 0.2/0.02/0.029/0.1 | 18 | 0.79 |

*Reactor = RL series, BDO/TPA (mol/mol) = 1.7/1.0.

The foregoing description of the preferred embodiments of this invention has been presented for purposes of illustration and description. Obvious modifications or variations are possible in light of the above teaching. The embodiments were chosen and described to provide the best illustration of said first co-catalyst comprises at least a metal acetate selected from the group consisting of Zn, Co, Mn, Mg, Ca, and Pb acetates.

7. A catalyst composition for use in the preparation of poly(butylene terephthalate) according to claim 1 wherein said first co-catalyst is present in an amount between about 0.0005 PHR to about 1 PHR.

8. A catalyst composition for use in the preparation of poly(butylene terephthalate) according to claim 1 wherein said first co-catalyst is present in an amount between about 0.01 PHR to about 0.6 PHR.

9. A catalyst composition for use in the preparation of poly(butylene terephthalate) according to claim 1 wherein said alkali metal phosphate contains one, two or three of alkali metals.

10. A catalyst composition for use in the preparation of poly(butylene terephthalate) according to claim 1 wherein said alkali metal in said alkali metal phosphate is lithium, sodium, or potassium, and said alkali metal phosphate contains one, two or three of said lithium, sodium, or potassium atoms.

11. A catalyst composition for use in the preparation of poly(butylene terephthalate) according to claim 1 wherein said alkali metal phosphite contains one or two of alkali metals.

12. A catalyst composition for use in the preparation of poly(butylene terephthalate) according to claim 1 wherein said alkali metal in said alkali metal phosphite is lithium, sodium, or potassium, and said alkali metal phosphate contains one or two of said lithium, sodium, or potassium atoms.

13. A catalyst composition for use in the preparation of poly(butylene terephthalate) according to claim 1 wherein said alkali metal in said alkali metal polyphosphate is lithium, sodium, or potassium, and said alkali metal polyphosphate contains one, two, three, four, or five alkali metal groups.

14. A catalyst composition for use in the preparation of poly(butylene terephthalate) according to claim 1 wherein said second co-catalyst is present in an amount between about 0.0005 PHR to about 1 PHR.

15. A catalyst composition for use in the preparation of poly(butylene terephthalate) according to claim 1 wherein said second co-catalyst is present in an amount between about 0.01 PHR to about 0.6 PHR.

16. A process for the preparation of poly(butylene terephthalate) from butylene glycol and either dimethyl terephthalate or terephthalic acid comprising the steps of:

(a) preparing a catalyst composition containing:
  (I) a titanium compound primary catalyst, from about 0.00001 PHR to about 5 PHR, wherein PHR represents parts, by weight, of said primary catalyst or said co-catalyst per one hundred parts, by weight, of dimethyl terephthalate, wherein said titanium compound primary catalyst is tetrabutyl titanate or tetra(isopropyl)titanate;
  (ii) a co-catalyst mixture containing a first co-catalyst comprising at least a metal compound selected from the group consisting of Zn, Co, Mn, Mg, Ca, and Pb compounds, from about 0.0001 PHR to 5 PHR, and a second co-catalyst containing an alkali metal phosphate, an alkali metal phosphite, an alkali hypophosphite, or an alkali metal polyphosphate, from about 0.0001 PHR to 5 PHR;

(b) placing said catalyst composition, said dimethyl terephthalate or said terephthalic acid, and said butylene glycol in a reaction vessel, said butylene glycol being in excess relative to said dimethyl terephthalate;

(c) raising reaction temperature to about 200°–280° C. to start a transesterification or an esterification reaction;

(d) raising reaction temperature to about 240°–300° C. and applying vacuum in said reaction vessel to start a polymerization reaction; and (e) removing unreacted butylene glycol from reaction product to obtain said poly(butylene terephthalate).

17. A process for the preparation of poly(butylene terephthalate) from dimethyl terephthalate according to claim 16 wherein said first co-catalyst comprises at least a metal acetate selected from the group consisting of Zn, Co, Mn, Mg, Ca, and Pb acetates.

* * * * *